United States Patent [19]

Kikuchi

[11] 3,746,411
[45] July 17, 1973

[54] SPINDLE HEAD DEVICE WITH SPINDLE AXIAL ADJUSTING MEANS

[75] Inventor: Makoto Kikuchi, Kariya, Japan

[73] Assignee: Toyoda Koki Kabushiki Kaisha, Kariya-shi, Japan

[22] Filed: Sept. 28, 1970

[21] Appl. No.: 76,053

[30] Foreign Application Priority Data

Sept. 27, 1969 Japan.............................. 44/92272

[52] U.S. Cl. .............................................. 308/168
[51] Int. Cl. ............................................ F16c 17/04
[58] Field of Search....................... 308/9, 162, 122, 308/168

[56] References Cited
UNITED STATES PATENTS

| | | | |
|---|---|---|---|
| 2,160,778 | 5/1939 | Doll et al........................... | 308/122 |
| 2,317,981 | 5/1943 | DeVlieg............................... | 308/13 |
| 2,578,711 | 12/1951 | Marlettotti......................... | 308/122 |
| 3,533,316 | 10/1970 | Porath................................. | 308/9 |
| 213,310 | 3/1879 | Yro..................................... | 308/162 |

*Primary Examiner*—Charles J. Myhre
*Assistant Examiner*—Frank Susko
*Attorney*—Oblon, Fisher & Spivak

[57] ABSTRACT

A spindle head device is equipped with means for axially adjusting the position of the spindle. The spindle is rotatably mounted in radial bearing members, and is axially supported in a thrust bearing assembly by means of static pressure generated in bearing pockets provided therein. The thrust bearing assembly is connected to an adjusting hand wheel through gear mechanism for adjusting the position of the spindle through the thrust bearing assembly. An annular chamber is formed between one end of the thrust bearing assembly and the radial bearing member and is connected to a fluid pressure source, whereby the thrust bearing assembly is pushed in one axial direction for maintaining the spindle at the desired position.

7 Claims, 4 Drawing Figures

SPINDLE HEAD DEVICE WITH SPINDLE AXIAL ADJUSTING MEANS

BACKGROUND OF THE INVENTION

This invention relates to a spindle head device in which the axial position of the spindle rotatably mounted therein is easily adjustable.

Heretofore, in conventional spindle head devices, no provision has been made for axially adjusting the position of the spindle rotatably mounted therein, and it has been found that many inconveniences in operating the same are caused as a result of the inability to make such adjustments. For instance, in a conventional grinding wheel spingle head device, when the grinding wheel is exchanged for a new grinding wheel because of the wear of the former, the position of the new grinding wheel is always different from the old one with respect to the workpiece or the dressing device according to the tolerance of the grinding wheel width or that of the grinding wheel sleeve, especially that of the tapered portion thereon. Therefore, it is necessary to readjust the position of the new grinding wheel relative to the workpiece. However, in conventional spindle head devices, the grinding wheel spindle cannot be axially moved, and adjustment of the grinding wheel spindle by displacing the same has been almost impossible. Thus, it has been necessary to move the the traverse table having head stock and tail stock thereon in order to adjust the position of the workpiece relative to the grinding wheel. These steps are usually very time consuming and, at the same time, they do not satisfactorily provide the degree of highly accurate adjustment to the grinding wheel position that is needed.

SUMMARY OF THE INVENTION

It is, therefore, an object of the present invention to provide an improved sindle head device which avoids the hereinbefore described disadvantages of conventional spindle head devices.

Another object of the present invention is to provide a spindle head device wherein a thrust bearing assembly for axially supporting the spindle is axially moved by an adjusting means comprising a gear mechanism, whereby the position of the spindle is easily adjusted.

A further object of the present invention is to provide an annular chamber between one end of a thrust bearing assembly and a radial bearing member in a spindle head device, being connected to a fluid pressure source for maintaining the spindle at a desired position by suitable applying fluid under pressure into the annular chamber.

BRIEF DESCRIPTION OF THE DRAWINGS

Other objects, advantages and features of the present invention will be more readily appreciated as the same becomes better understood from the following description of a preferred embodiment of the present invention, when considered in connection with the accompanying Drawings, in which like reference numerals designate like or corresponding parts throughout the several Figures, and wherein.

DETAILED DESCRIPTION OF THE ILLUSTRATED EMBODIMENTS

Figure 1:
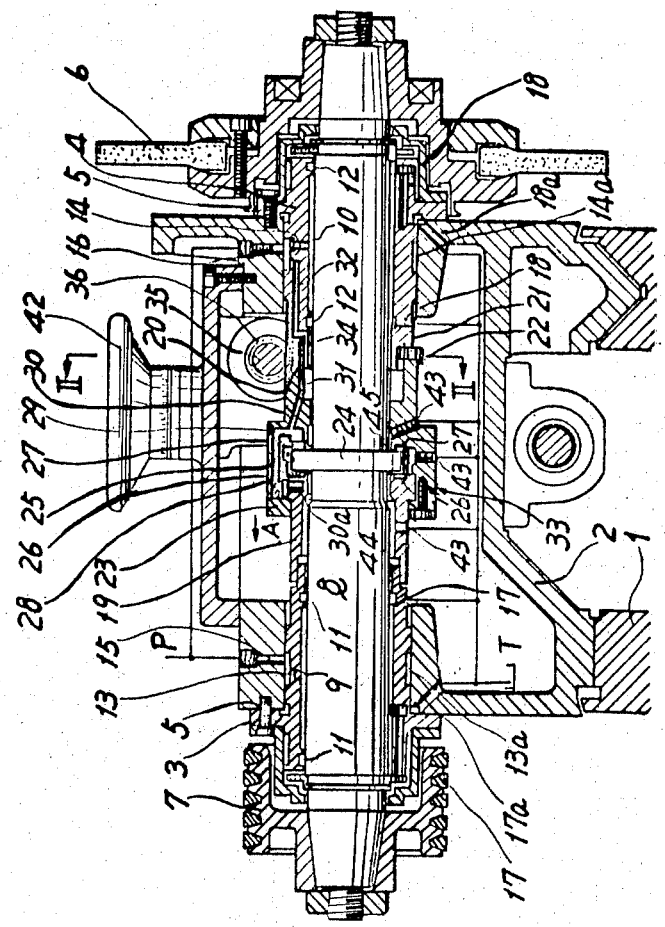
FIG. 1 is a longitudinal sectional view of a spindle head device formed according to the present invention.

Now, with reference to the accompanying Drawings, and more particularly to FIG. 1 thereof, there is shown a grinding wheel spindle head device constructed according to the present invention which comprises a bed 1 having a grinding wheel head 2 slidably mounted thereon. Radial bearing members 3 and 4 are secured to the grinding wheel head 2 with screws 5. In the radial bearing members 3 and 4 there is rotatably mounted a grinding wheel spindle 8, with suitable clearances therebetween, having a grinding wheel 6 at one end thereof and a pulley 7 for driving the grinding wheel 6 at the other end.

In the inner surface of each of the radial bearing members 3 and 4, there is provided a plurality of circumferentially recessed axially-extending, recess bearing pockets 9 and 10, respectively, for hydrostatically supporting the grinding wheel spindle 8 therein. Annular groove sets 11, 11 and 12, 12 in each of the bearing members 3 and 4, respectively, adjacent the axial ends of the bearing pockets 9 and 10 therein, provide for evacuation of the hydraulic fluid. The bearing pockets 9 and 10 are connected to a pressure source, not shown, through suitable radial orifices 13 and 14 formed in the bearing members 3 and 4, respectively, annular grooves 13a and 14a, respectively formed on the outer periphery of the radial bearing members 3 and 4, and respective passages 15 and 16 formed in the grinding wheel head 2. On the other hand, the pairs of annular grooves 11 and 12 are connected to an oil reservoir T through passages 17, 17 and 18, 18 respectively formed in the bearing members 3 and 4, and through passages 17 and 18a in the grinding wheel head 2. Therefore, when fluid under pressure is supplied to the bearing pockets 9 and 10, a resultant static pressure which is thereby generated rotatably supports the spindle 8 within the bearing members 3 and 4. In this process, the fluid is evacuated into the annular grooves 11, 11 and 12, 12 through the respective clearances between the inner surfaces of the radial bearing members 3 and 4, and the suspended spindle 8, and afterwards flows out to the oil reservoir T. As a result, the fluid-supported spindle 8, in case of necessity, can readily be axially moved in the radial bearing members 3 and 4.

A thrust bearing assembly generally indicated by the numeral 33 comprises thrust bearing members 19 and 20 which are fixedly secured to each other by a keep plate 23. The thrust bearing member 19 is slidably and sealingly mounted on the radial bearing member 3. On the other hand, the thrust bearing member 20 is also slidably and sealingly mounted on the radial bearing member 4 and the spindle 8, and an annular chamber 31 is formed therebetween, the purpose of which is set forth hereinbelow. The thrust bearing member 20 includes a pin, or key, 22, engaged with an axially extending slot 21 formed on the outer periphery of the radial member 4 for preventing rotation of the thrust bearing assembly 33. The pin 22 and the axial slot 21 for accommodating the same may also be provided on the bearing members 3 and 19, respectively, if desired.

Another annular chamber 25 is formed in the thrust bearing assembly 33. A flange 24 formed on the midway portion of the spindle 8 is housed in the chamber 25 with suitable clearances being maintained between both sides of the chamber 25 and that of the flange 24. On each side of the chamber 25 are formed recessed bearing pockets 26 and 27, respectively, in the form of a circular groove, a plurality of arcuate grooves or the like, opposite to the side ends of the flange 24. A plurality of suitable orifices 28 and 29 are connected to the bearing pockets 26 and 27, and interconnect the same with passages 30 and 30a formed in the thrust bearing assembly 33. The passage 30 is connected to the pressure source, not shown, through the annular chamber 31, a substantially axially-extending passage 32 formed in the radial bearing member 4, the annular groove 14a, and the passage 16. Therefore, when fluid under pressure is supplied to the bearing pockets 26 and 27, a resultant static pressure is generated in that vicinity for axially supporting the spindle 8. Fluid is thereafter evacuated to the oil reservoir T through the clearances between the sides of the flange 24 and that of the chamber 25, relatively large clearances 44 and 45 between the bearing assembly 33 and the spindle 8, the chamber 25, and passages 43, 43 formed in the thrust bearing assembly 33.

As hereinbefore mentioned, the spindle 8 is hydrostatically and rotatably mounted in the radial bearing members 3 and 4, and similarly is axially hydrostatically supported in the thrust bearing assembly 33.

Figure 3:
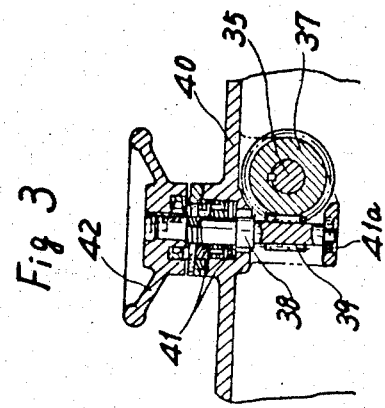
FIG. 3 is a sectional view along the line III—III of FIG. 2.
Figure 2:
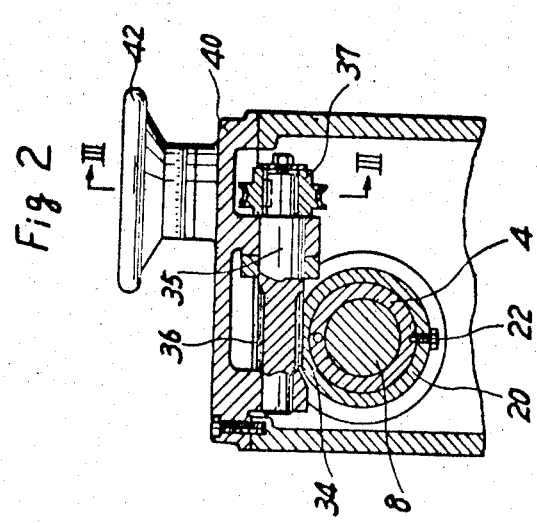
FIG. 2 is a sectional view taken along the line II—II of FIG. 1.

The thrust bearing member 20, or, alternatively, if desired, the thrust member 19, is partially provided with a rack 34. This rack 34 engages a pinion 36 formed on a pinion shaft 35, as shown in FIG. 2, which is journalled in a supporting member 40 attached to the grinding wheel head 2. A worm wheel 37 is keyed to the pinion shaft 35, as shown in FIG. 3, and engages a worm 39 formed at one end of a worm shaft 38. At the other end of the worm shaft 38, there is an adjusting hand wheel 42 keyed thereto. The worm shaft 38 is journalled in anti-friction ball bearings 41 and 41a mounted in the supporting member 40 at opposite ends of the shaft.

In the aforedescribed structure, the method of adjusting the axial position of the grinding wheel 6, relative to the workpiece or the dressing device, mounting on one end of the grinding spindle 8, comprises adjusting the hand wheel 42 manually or mechanically for rotating the worm shaft 38. The rotation of the worm shaft 38 is reduced through the mesh of the worm 39 and the worm wheel 37, and is then transmitted to the pinion shaft 35. Moreover, the rotation transmitted to the pinion shaft 35 is converted into axial displacement of the thrust bearing assembly 33 through the mesh of the rack 34 and the pinion 36. Therefore, as the rotation of the adjusting hand wheel 42 is reduced through the mesh of the worm 39 and the worm wheel 37, an extremely fine displacement of the thrust bearing assembly 33 can be realized. In addition, the mesh of the worm 39 and the worm wheel 37 serves to limit the axial movement of the thrust bearing assembly 33 effected by the axial force acting on the grinding wheel spindle 8. In this case, the spindle 8 is rotatably journalled in the radial bearing members 3 and 4 by the static pressure generated in the recessed bearing pockets 9 and 10 and is axially supported in the thrust bearing assembly 33 by the static pressure generated in the recessed bearing pockets 26 and 27, and therefore the axial movement of the thrust bearing assembly 33 causes axial movement also of the spindle 8 through the hydrostatic connection therebetween. In consequence, extreme fine adjustment of the spindle 8, and simultaneously of the grinding wheel 6, can be realized. Moreover, as the fluid under pressure supplied to the chamber 31 usually acts on the bearing member 20 to push the thrust bearing assembly 33 in the leftward direction as indicated by an arrow A in FIG. 1, the spindle 8 is maintained at the desired position for grinding or dressing Furthermore, backlash Furthermore, backlast taken up between gear mechanism, for example, the engagements of the rack 34 and the pinion 36 and of the worm wheel 37 and the worm 39, to move the thrust bearing assembly 33, is completely eliminated and thereby the position of the spindle 8 or the grinding wheel 6 can be adjusted with extremely high accuracy.

Figure 4:
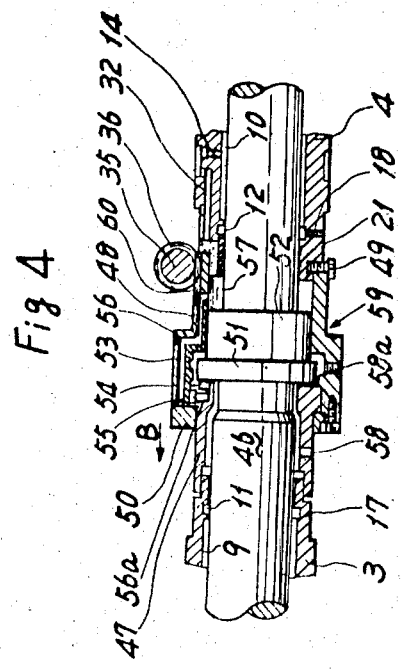
FIG. 4 is a partially sectional view of another embodiment of the present invention.

FIG. 4 shows another embodiment of a spindle head device constructed according to the present invention. Similar to the first embodiment, a spindle 46 is rotatably mounted in radial bearing members 3 and 4, and a thrust bearing assembly generally indicated by the numeral 59 comprises thrust bearing members 47 and 48, which are rigidly secured to each other by a keep plate 50. The thrust bearing member 47 is slidably and sealingly mounted on the radial bearing member 3, and the thrust bearing member 48 is slidably and sealingly mounted on the radial bearing member 4. A stepped portion 52 is formed on the midway portion of the spindle 46 and an annular chamber 57 is formed between the stepped portion and the thrust bearing member 48. The thrust bearing member 48 is provided with a pin, or key, 49, which engages an axially entending slot 21 formed on the outer periphery of the radial bearing member 4 for preventing rotation of the thrust bearing assembly 59. Moreover, another annular chamber 53 is formed in the thrust bearing assembly 59. A flange 51 formed on the spindle 8 adjacent to the stepped portion 52 is housed in the annular chamber 53 with suitable clearance between the one side wall of the annular chamber 53 and that of the flange 51.

On the other side of the chamber 53, facing the flange 51, there is formed in the bearing member 47 a recessed bearing pocket 54, such as a circular groove, a plurality of arcuate grooves, or the like. At least one suitable orifice 55 is provided between the bearing pocket 54 and a radial passage 56a formed in the thrust bearing member 47. Another passage 56 formed in the thrust bearing member 48 and connected to the passage 56a, is connected to the pressure source through the annular chamber 57, the passage 32, the annular groove 14a, and passage 14, in the same manner as shown in FIGS. 1 and 3.

Therefore, when fluid under pressure is supplied to the bearing pocket 54 from the pressure source, static pressure is generated therein, and afterward fluid is evacuated to the oil reservoir T through the clearance between the side end of the flange 51 and that of the chamber 53, the relatively large clearances between the spindle 46 and the thrust assembly 59, and passages 58 and 58a formed in the thrust bearing assembly 59. On the other hand, fluid under pressure supplied to the chamber 57 acts to push the thrust bearing means 59 in the direction of the arrow B, as shown in FIG. 4, so as to urge the flange 51 toward abutting relation with the side end of the chamber 53. However, the flange 51 cannot abut with the side end of the chamber 53 because of the static pressure in the recessed bearing pocket 54, and therefore, the flange 51, and more particularly, spindle 46, is axially maintained at the position where the pressure in the chamber 57 and the static pressure in the bearing pocket 54 are in a balanced condition.

Furthermore, the thrust bearing member 48 is provided with a rack 60 which is similar to that of the first embodiment, as shown in FIG. 1, and is axially moved thereby upon actuation of the adjusting hand wheel 42 operating through the gear mechanism. Therefore, the displacement of the thrust bearing assembly 59 causes the spindle 46 to move axially, and fine adjustment of the spindle 46 may accordingly be realized.

As hereinbefore described, the bearing assembly 59 is axially pushed in the direction of the arrow B, as shown in FIG. 4, backlash taken up in the gear mechanism for adjusting the position of the spindle 46 is completely eliminated and, thereby, the position of the spindle 46, or the grinding wheel 6, can be adjusted with extremely high accuracy.

Accordingly, this invention concerns an improved spindle head device wherein the spindle is rotatably mounted in radial bearing members, and moreover is axially supported in a thrust bearing assembly which can be axially moved by means of gear mechanism equipped with backlash eliminating means, whereby the position of the spindle is easily adjusted with simple operation and extremely high accuracy. For instance, when the present invention is applied to a grinding wheel spindle head device, the grinding wheel spindle can be axially moved and the position of the grinding wheel thereby adjusted, with relative simplicity yet with extremely good accuracy, relative to the workpiece or the dressing device, even if the grinding wheel position is different from the preceding one whenever an exchange of grinding wheels is carried out. Therefore, it is not necessary, as with present spindle head devices, to move the grinding wheel head, having the head stock and the tail stock thereon, or the dressing device to adjust the grinding wheel position with respect to the workpiece or the dressing device, and the spindle head device according to the present invention is thus very efficient in its operation. Furthermore, in cases where the grinding wheel spindle is biased under a thermal influence, the grinding wheel position is varied from its initial position, and this variation of the grinding wheel position affects the accuracy of the grinding process being performed. Therefore, the spindle head device of the present invention also is available for continuously adjusting grinding wheel spindle positions as they are varied by such thermal influences.

Although the present invention has been described as a grinding wheel spindle head device, it is to be understood that is is not necessarily limited to spindle head devices of grinding machines only, but it also may be utilized with conventional spindle head devices of machine tools and other devices. Furthermore, compressed air may be utilized for supporting the spindle in the radial bearing members and the thrust bearing members, instead of hydraulic fluid as disclosed herein.

Obviously, many modifications and variations of the present invention are possible in light of the above teachings. It is to be understood, therefore, that within the scope of the appended claims, the invention may be practiced otherwise than as specifically described herein.

What is claimed and desired to be secured by letters patent of the United States is:

1. In a spindle head device having a pair of radial bearing means and a spindle having a flange intermediate its ends being rotatably mounted in said radial bearing means, the improvement comprising:
    thrust bearing means slidably and sealingly mounted on one of said radial bearing means and said spindle and being located between said pair of radial bearing means for axially supporting said spindle, said thrust bearing means providing a first annular chamber being disposed about said flange of said spindle, at least one recessed bearing pocket on each side of said first annular chamber opposite said flange, means connecting said bearing pockets to a fluid pressure source, and a second annular chamber between said one of said radial bearing means and said spindle being connected to at least one of said bearing pockets and said fluid pressure source, such that said thrust bearing means is normally urged in one axial direction by the pressure in said second annular chamber; and
    adjusting means connected to said thrust bearing means for moving said thrust bearing means for causing said spindle being supported by static pressure generated in said pocket to be axially shifted in said radial bearing means.

2. A spindle head device as set forth in claim 1, wherein said adjusting means comprises an adjusting control wheel, a rack on said thrust bearing means, and means connecting said control wheel and said rack for effecting movement of said thrust bearing means upon movement of said control wheel.

3. In a spindle head device having a pair of radial bearing means and a spindle having a flange intermediate its ends being rotatably mounting in said radial bearing means, the improvement comprising:
    thrust bearing means slidably and sealingly mounted on one of said pair of radial bearing means and said spindle providing a first annular chamber being disposed about said flange of said spindle, at least one recessed bearing pocket on one side of said first annular chamber opposite said flange being connected to a fluid pressure source, and a second annular chamber between said one of said radial bearing means and said spindle being connected to said bearing pocket and said fluid pressure source, such that said thrust bearing means is maintained at a desired position by static pressure being generated in said bearing pocket and the pressure in said second annular chamber; and
    adjusting means connected to said thrust bearing means for moving said thrust bearing means, whereby said spindle supported in said thrust bearing means is caused to be moved therewith axially between said pair of radial bearing means by operation of said adjusting means.

4. In a spindle head device having a pair of radial bearing means and a spindle having a flange intermediate its ends being rotatably mounted in said radial bearing means, the improvement comprising:
    thrust bearing means for axially supporting said spindle and being axially adjustable;
    said thrust bearing means providing a first annular chamber formed therein in which said flange is positioned and having at least one recessed bearing pocket on each side of said first annular chamber opposite said flange;

adjusting means connected to said thrust bearing means for axially moving the same; and means connecting said bearing pockets to a fluid pressure source, whereby said spindle is axially supported in said thrust bearing means by static pressure generated in said bearing pockets and is axially movable by operation of said adjusting means.

5. A spindle head device as set forth in claim 4, wherein said adjusting means comprises:

an adjusting wheel;

a pinion connected to said adjusting wheel; and a rack mounted on said thrust bearing means and being engageable with said pinion.

6. A spindle head device as set forth in claim 4, wherein said radial bearing means comprises:

a plurality of radial bearing pockets; and means connecting said radial bearing pockets to a fluid pressure source, whereby said spindle is radially supported in said radial bearing means by static pressure generated in said radial bearing pockets.

7. A spindle head device as claimed in claim 4, wherein said fluid pressure source is a hydraulic pressure source, whereby said spindle is axially supported hydraulically within said thrust bearing means.

* * * * *